US009059958B2

(12) United States Patent
Wang (10) Patent No.: US 9,059,958 B2
(45) Date of Patent: Jun. 16, 2015

(54) USER REGISTRATION METHOD, INTERACTION METHOD AND RELATED DEVICES

(75) Inventor: Peng Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 288 days.

(21) Appl. No.: 13/557,813

(22) Filed: Jul. 25, 2012

(65) Prior Publication Data

US 2013/0198382 A1    Aug. 1, 2013

(30) Foreign Application Priority Data

Nov. 28, 2011  (CN) .......................... 2011 1 0384980

(51) Int. Cl.
*H04L 12/58* (2006.01)
*H04L 29/06* (2006.01)

(52) U.S. Cl.
CPC ............ *H04L 51/36* (2013.01); *H04L 65/1069* (2013.01); *H04L 65/1073* (2013.01); *H04L 63/083* (2013.01)

(58) Field of Classification Search
None
See application file for complete search history.

(56) References Cited

U.S. PATENT DOCUMENTS

| | | | | |
|---|---|---|---|---|
| 7,136,915 B2* | 11/2006 | Rieger, III | ..................... | 709/223 |
| 7,509,272 B2* | 3/2009 | Bailey et al. | ................. | 705/26.3 |
| 7,742,996 B1* | 6/2010 | Kwan | ............................. | 705/72 |
| 2002/0072997 A1* | 6/2002 | Colson et al. | ................... | 705/27 |
| 2002/0103892 A1* | 8/2002 | Rieger, III | ..................... | 709/223 |
| 2002/0157090 A1* | 10/2002 | Anton, Jr. | ..................... | 717/178 |
| 2002/0169760 A1* | 11/2002 | Cheung et al. | .................... | 707/3 |
| 2003/0233278 A1* | 12/2003 | Marshall | ......................... | 705/14 |
| 2005/0009517 A1 | 1/2005 | Maes | | |
| 2005/0283420 A1* | 12/2005 | Bailey et al. | .................... | 705/37 |
| 2007/0067297 A1* | 3/2007 | Kublickis | .......................... | 707/9 |
| 2007/0118801 A1* | 5/2007 | Harshbarger et al. | ......... | 715/730 |
| 2008/0071634 A1* | 3/2008 | Rampell et al. | ................. | 705/26 |
| 2008/0294744 A1 | 11/2008 | Yamazaki | | |
| 2009/0150237 A1* | 6/2009 | Gupta et al. | .................... | 705/14 |
| 2009/0158402 A1 | 6/2009 | Ding | | |

(Continued)

FOREIGN PATENT DOCUMENTS

| | | |
|---|---|---|
| CN | 101127625 A | 2/2008 |
| CN | 101277476 A | 10/2008 |

(Continued)

OTHER PUBLICATIONS

Campbell et al., "The Message Session Relay Protocol (MSRP)" Network Working Group, Sep. 2007.

(Continued)

*Primary Examiner* — Ranodhi Serrao
(74) *Attorney, Agent, or Firm* — Brinks Gilson & Lione (57) ABSTRACT

The present invention relates to the field of communications technologies, and discloses a user registration method, an interaction method and related devices. The user registration method includes: receiving an invite request that is sent by a registered user of a system through a first system client, where the invite request includes an identifier of an unregistered user of the system; obtaining a temporary account allocated to the unregistered user of the system and valid in the system; sending, according to the identifier of the unregistered user of the system, the temporary account to a terminal used by the unregistered user of the system. By use of the present invention, registered users of one system are capable of interacting with unregistered users of the system.

20 Claims, 5 Drawing Sheets

```
┌─────────────────────────────────────────────────────────────┐
│  Receive an invite request that is sent by a registered     │ 101
│  user of a system through a first system client             │
└──────────────────────────┬──────────────────────────────────┘
                           ▼
┌─────────────────────────────────────────────────────────────┐
│  Obtain a temporary account allocated to the unregistered   │ 102
│  user of the system and valid in the system                 │
└──────────────────────────┬──────────────────────────────────┘
                           ▼
┌─────────────────────────────────────────────────────────────┐
│  Send, according to the identifier of the unregistered      │
│  user of the system, the temporary account to a terminal    │ 103
│  used by the unregistered user of the system                │
└─────────────────────────────────────────────────────────────┘
```

(56) References Cited

U.S. PATENT DOCUMENTS

| | | | |
|---|---|---|---|
| 2009/0177541 A1* | 7/2009 | Martel et al. | 705/14 |
| 2010/0011073 A1* | 1/2010 | Kachaylo et al. | 709/206 |
| 2012/0102008 A1* | 4/2012 | Kaariainen et al. | 707/705 |

FOREIGN PATENT DOCUMENTS

| | | |
|---|---|---|
| CN | 101369893 A | 2/2009 |
| WO | WO 2005/004505 A2 | 1/2005 |

OTHER PUBLICATIONS

Tiilikainen, "SIP(RFC 2543), an Implementation for Marratech Pro" Lulea Tekniska Universitet—Master's Thesis, Apr. 2000.

International Search Report issued in corresponding PCT Patent Application No. PCT/CN2012/073779, mailed Sep. 27, 2012.

* cited by examiner

USER REGISTRATION METHOD, INTERACTION METHOD AND RELATED DEVICES

CROSS-REFERENCE TO RELATED APPLICATION

This application claims priority to Chinese Patent Application No. 201110384980.6, filed on Nov. 28, 2011, which is hereby incorporated by reference in its entirety.

FIELD OF THE INVENTION

The present invention relates to the field of communications technologies, and in particular, to a user registration method, an interaction method and related devices.

BACKGROUND OF THE INVENTION

A rich communication suite (RCS: Rich Communication Suite) solution is an integrated communication and information sharing platform that crosses communication networks and Internet. A user may use a real mobile phone number as a login account to perform instant messaging (IM: Instant Messaging) communication with a contact through a personal computer (PC: Personal Computer) client, a web (Web) client or a mobile phone client of the RCS solution, or upload, download and share content such as pictures, music, videos and texts. Not only can the RCS solution expand a social network of the user, but also can provide a diverse life style for the user.

However, like an ordinary IM interaction tool, if two users need to perform interaction (such as IM interaction and file interaction) by using the same type of clients, the RCS solution requires that the two users should be registered users of a system corresponding to the clients. For example, if user A and user B need to perform interaction through RCS clients, both user A and user B should be registered users of an RCS system. As a result, registered users of a system (IM system, RCS system, and so on) cannot interact with unregistered users of the system.

SUMMARY OF THE INVENTION

Embodiments of the present invention provide a user registration method, an interaction method and related devices, which may enable registered users of a system to interact with unregistered users of the system.

An embodiment of the present invention provides a user registration method, including:

receiving an invite request that is sent by a registered user of a system through a first system client, where the invite request includes an identifier of an unregistered user of the system;

obtaining a temporary account allocated to the unregistered user of the system and valid in the system; and sending, according to the identifier of the unregistered user of the system, the temporary account to a terminal used by the unregistered user of the system.

Another embodiment of the present invention provides an interaction method, including:

receiving a temporary account that is from a system gateway, and using the temporary account to send a login request to the system gateway, where the temporary account is allocated to an unregistered user of a system and valid in the system;

receiving information of a registered user of the system inviting the unregistered user of the system, where the information is returned by the system gateway; and sending, to the system gateway, an interaction message that needs to be sent to the registered user of the system, where the interaction message carries the temporary account, so that the system gateway forwards the interaction message to a first system client used by the registered user of the system after the system gateway has authenticated the temporary account.

Another embodiment of the present invention provides an interaction method, including:

receiving a login request sent by a second system client, where the login request carries a temporary account allocated to an unregistered user of a system and valid in the system;

after authentication of the temporary account carried in the login request succeeds, sending, to the second system client, information of a registered user of the system inviting the unregistered user of the system;

receiving an interaction message that is from the second system client and needs to be sent to the registered user of the system, where the interaction message carries the temporary account; and after authentication of the temporary account carried in the interaction message succeeds, forwarding the interaction message to a first system client used by the registered user of the system.

Another embodiment of the present invention provides a system gateway, including:

a receiving unit, configured to receive an invite request that is sent by a registered user of a system through a first system client, where the invite request includes an identifier of an unregistered user of the system;

an obtaining unit, configured to obtain a temporary account allocated to the unregistered user of the system and valid in the system; and a sending unit, configured to send, according to the identifier of the unregistered user of the system, the temporary account to a terminal used by the unregistered user of the system.

Another embodiment of the present invention provides a terminal, including:

a receiving unit, configured to receive a temporary account that is from a system gateway, where the temporary account is allocated to an unregistered user of a system and valid in the system; and a sending unit, configured to send a login request to the system gateway, where the login request includes the temporary account received by the receiving unit, where the receiving unit is further configured to receive information of a registered user of the system inviting the unregistered user of the system, where the information is returned by the system gateway; and the sending unit is further configured to send, to the system gateway, an interaction message that needs to be sent to the registered user of the system, where the interaction message carries the temporary account, so that the system gateway forwards the interaction message to a first system client used by the registered user of the system after the system gateway has authenticated the temporary account.

Another embodiment of the present invention provides a system gateway, including:

a receiving unit, configured to receive a login request sent by a second system client, where the login request carries a temporary account allocated to an unregistered user of a system and valid in the system;

an authentication unit, configured to perform authentication on the temporary account carried in the login request; and a sending unit, configured to send, to the second system client, information of a registered user of the system inviting the unregistered user of the system after the authentication unit has authenticated the temporary account carried in the login request, where the receiving unit is further configured to receive an interaction message that is from the second system client and needs to be sent to the registered user of the system, where the interaction message carries the temporary account;

the authentication unit is further configured to perform authentication on the temporary account carried in the interaction message; and the sending unit is further configured to forward the interaction message to a first system client used by the registered user of the system after the authentication unit has authenticated the temporary account carried in the interaction message.

It can be seen from the above technical solutions provided by the embodiments of the present invention that, since the system gateway in the embodiment of the present invention may allocate a temporary account to the unregistered user of the system when the registered user of the system requires the unregistered user of the system to perform interaction, and may send the temporary account to the unregistered user of the system, so that the unregistered user of the system may use the temporary account to interact with the registered user of the system. In this way, registered users of a system may interact with unregistered users of the system, so that the registered users of the system may have better service experience and the unregistered users of the system are more willing to register with the system and become registered users of the system.

BRIEF DESCRIPTION OF THE DRAWINGS

To illustrate the technical solutions according to the embodiments of the present invention more clearly, the accompanying drawings required for describing the embodiments are described below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

The technical solutions in the embodiments of the present invention are clearly and fully described in the following with reference to the accompanying drawings in the embodiments of the present invention. Obviously, the embodiments described are only a part rather than all of the embodiments of the present invention. All other embodiments obtained by persons of ordinary skill in the art based on the embodiments of the present invention without creative efforts shall fall within the protection scope of the present invention.

Figure 1:
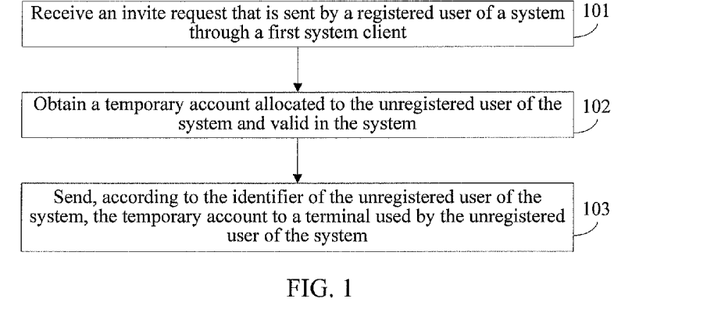
FIG. 1 is a flow chart of a user registration method according to an embodiment of the present invention.

A user registration method provided by an embodiment of the present invention is described first. FIG. 1 describes a process of a user registration method according to an embodiment of the present invention. The embodiment describes a processing process of a system gateway, where the system gateway varies with different systems. For example, when the system is an RCS system, the system gateway is an RCS gateway; when the system is an IM system, the system gateway is an IM gateway. The embodiment includes the following steps:

101: Receive an invite request that is sent by a registered user of a system through a first system client, where the invite request carries an identifier of an unregistered user of the system.

The invite request received by the system gateway is based on an intra-system interaction protocol. For example, in the RCS system, the invite request is transmitted through an Internet protocol multimedia subsystem (IMS: IP multimedia subsystem) core network. The RCS gateway may receive the invite request from a rest interface, where the invite request may be based on a hypertext transport protocol (HTTP: HyperText Transport Protocol) or an internal self-defined protocol. In the IM system, the invite request is based on an internal protocol used by the IM system. The first system client refers to a client used by the registered user of the system. In a process that the first system client obtains the identifier of the unregistered user of the system, the first system client may obtain the identifier by selecting, by the registered user of the system, the identifier from an address book on the terminal used by the registered user of the system, or obtain the identifier by receiving an input of the registered user of the system.

In an embodiment of the present invention, after obtaining the identifier of a user in the invite request, the first system client may first query a registered user information center of the system for the identifier of the user. If the identifier of the user is not obtained by querying the registered user information center, the first system client may determine that the user does not register with the system, and thereby, the first system client sends the invite request to the system gateway only when the first system client determines that the user does not register with the system. The registered user information center of the system varies with different systems. For example, the registered user information center may be an RCS user center (RCS UP Center) in the RCS system, and may be an IM Server in the IM system.

The identifier of the unregistered user of the system carried in the invite request may be an E-mail (E-mail) address, a terminal number of the unregistered user of the system, and so on.

102: Obtain a temporary account allocated to the unregistered user of the system and valid in the system.

The temporary account may be allocated by the system gateway to the unregistered user of the system. Specifically, the system gateway may directly use the identifier of the unregistered user of the system as the temporary account, or may allocate a serial number of the system as the temporary account, or may adopt other manners to allocate the temporary account. The embodiment of the present invention does not limit a specific form of the temporary account or an allocation manner of the temporary account, so long as it is ensured that the allocated temporary account is unique in the system. It is also possible that the system gateway sends the identifier of the unregistered user of the system to the registered user information center of the system, and the registered user information center of the system allocates the temporary account to the unregistered user of the system and then sends the temporary account to the system gateway.

In another embodiment of the present invention, in order to improve system security, when the temporary account is allocated to the unregistered user of the system, a login password used when the temporary account is used for logging in to the system may be further allocated.

103: Send, according to the identifier of the unregistered user of the system, the temporary account to a terminal used by the unregistered user of the system.

According to different identifiers of the unregistered user of the system, the system gateway may send the temporary account to the unregistered user of the system through different channels. It is understandable that, a channel through which the system gateway sends the temporary account and a channel through which the system gateway receives the invite request are different. The invite request is generally received through an intra-system channel, and the channel for sending the temporary account varies with different types of the identifiers of the unregistered user of the system. According to different channels, the system gateway may adopt different manners to send the invite request. For example, when the identifier of the unregistered user of the system is an E-mail address of the unregistered user of the system, the system gateway may send the temporary account to the E-mail address by means of an E-mail; when the identifier of the unregistered user of the system is a terminal number, the temporary account is sent to a terminal corresponding to the terminal number through a short message or a multimedia short message.

If the login password corresponding to the temporary account is allocated, when the temporary account is sent to the terminal used by the unregistered user of the system, the login password is also sent to the terminal used by the unregistered user of the system.

Specifically, in order to facilitate the operation of the unregistered user of the system, the temporary account or the temporary account and the login password may be set in an invite link, and then the invite link is sent to the terminal used by the unregistered user of the system. After receiving the invite link, the unregistered user of the system may directly click the invite link to log in to the system, thereby reducing operation complexity for the unregistered user of the system.

It can be known from the above that, the system gateway in this embodiment may allocate a temporary account to the unregistered user of the system when the registered user of the system requires the unregistered user of the system to perform interaction, and may send the temporary account to the unregistered user of the system, so that the unregistered user of the system may use the temporary account to interact with the registered user of the system. In this way, registered users of a system are capable of interacting with unregistered users of the system, so that the registered users of the system may have better service experience and the unregistered users of the system are more willing to register with the system and become registered users of the system.

In another embodiment of the present invention, the invite request received by the system gateway may further carry an account of a registered user of a system that initiates the invite request. At this time, in order to improve system security, after allocating the temporary account to the unregistered user of the system, the system gateway may further store an invite relationship between the account of the registered user of the system that initiates the invite request and the temporary account, so that in a subsequent interaction process, only interaction between the temporary account and the account of the registered user of the system having an invite relationship with the temporary account is allowed.

Further, when the invite request received by the system gateway carries the account of the registered user of the system that initiates the invite request, the system gateway may determine, according to the account of the registered user of the system, whether the registered user of the system has a right to send an invite request, and only when it is determined that the registered user of the system has the right to send an invite request, the temporary account allocated to the unregistered user of the system is obtained, thereby preventing a registered user of the system without the right from sending the invite request, and improving system security and stability. The type of right that enables an invite request to be sent may be set by a system operator. For example, all registered users of the system may send an invite request, or only valid registered users of the system are allowed to send an invite request, or only valid registered users of the system that are at a certain level are allowed to send an invite request. The valid registered users of the system refer to registered users of the system that are capable of using system functions normally. For example, if an account of a registered user of the system is in a loss reporting status, the registered user of the system is not a valid registered user of the system.

In another embodiment of the present invention, the invite request received by the system gateway further carries an interaction type of interaction that the registered user of a system invites the unregistered user of the system to perform. At this time, after obtaining the temporary account allocated to the unregistered user of the system and valid in the system, the system gateway may further register the temporary account on an interaction server corresponding to the interaction type. For example, when the interaction type of the interaction that the registered user of the system invites the unregistered user of the system to perform is IM interaction, the system gateway may register the temporary account on an IM server. When the interaction type of the interaction that the registered user of the system invites the unregistered user of the system to perform is file interaction, the system gateway may register the temporary account on a file server. In this way, when the unregistered user of the system uses the temporary account to interact with the registered user of the system subsequently, verification on the interaction server may succeed. It is understandable that, when the temporary account is allocated by the registered user information center of the system, the system gateway may not need to register the temporary account on the interaction server corresponding to the interaction type.

In another embodiment of the present invention, the system is the RCS system. Then, after obtaining the temporary account allocated to the unregistered user of the system and valid in the system, the RCS gateway may further register the temporary account at an Internet protocol multimedia subsystem (IMS: IP multimedia subsystem) core network. Because interaction information in the RCS system is transmitted through the IMS core network, registering the temporary account at the IMS core network may ensure that the unregistered user of the system may use the temporary account to transmit interaction information on the IMS core network.

Figure 2:
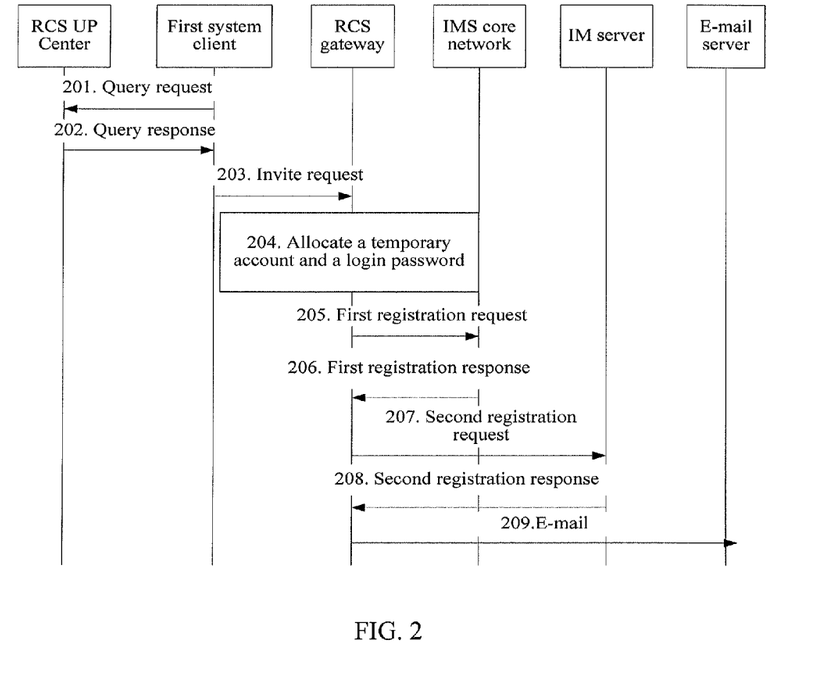
FIG. 2 is a signaling flow chart of a user registration method according to another embodiment of the present invention.

FIG. 2 describes a signaling process of a user registration method according to another embodiment of the present invention. The embodiment specifically describes a process that a user registers when a registered RCS user invites an unregistered RCS user to perform IM interaction in an RCS system. The embodiment includes the following steps:

201: After receiving an instruction initiated by user A for performing IM interaction with user B, a first system client sends, to an RCS UP Center, a query request used to query information to check whether user B is a registered RCS user, where the query request carries an identifier of user B.

User A is a registered RCS user, and the first system client is an RCS standard client. After logging in to the first system client, user A may select the identifier of user B from a contact list of the first system client or from an address book of the terminal, or user A may input the identifier of user B.

202: The RCS UP Center queries whether user B is a registered RCS user according to the identifier of user B, and returns a query response carrying a query result to the first system client.

203: After receiving the query response, the first system client obtains the query result. If the query result is that user B is a registered RCS user, a normal RCS interaction process is started. The normal RCS interaction process is not described in the embodiment of the present invention. If the query result is that user B is an unregistered RCS user, the first system client sends an invite request to an RCS gateway, where the invite request carries identity verification information of user A and the identifier of user B, and the identity verification information of user A includes information such as an account and a login password of user A.

It is assumed that the user identifier of user B is an E-mail address, and the E-mail is b@cc.com. In this case, the invite request provided by an embodiment of the present invention may be shown as follows:

POST http://host:port/rcsgw/invitee/user HTTP/1.1
Authorization: Basic QUNSO1NFQ1VSSVRZVE9LRU4=
Content Type: application/json; charset=UTF-8
{"email":"b@cc.com"} where the identity verification information of user A is stored in an Authorization header field, and the content of the Authorization header field is a character string obtained by performing BASE64 encryption on the identity verification information of user A.

204: After receiving the invite request, the RCS gateway uses the identity verification information of user A carried in the invite request to verify whether user A has a right to send an invite request, and after determining that user A has a right to send an invite request, allocates a temporary account and a login password to user B.

An account in the RCS system may be a session initiation protocol uniform resource identifier (SIP URI: Session Initiation Protocol Uniform Resource Identifier). In this embodiment, it is assumed that the RCS gateway uses an E-mail address to generate the temporary account. Then, the generated temporary account is sip:b@cc.com.

After allocating the temporary account and the login password to user B, the RCS gateway may add information of the temporary account allocated to user B to a temporary account table. Specifically, the temporary account table may store the identifier of user B, and the temporary account and the login password that are allocated to user B. In this case, before allocating the temporary account to user B, the RCS gateway may first query the temporary account table to determine whether a temporary account is already allocated to user B. If a temporary account is already allocated, the temporary account allocated to user B and recorded in the temporary account table may be used directly.

Further, the RCS gateway may further record an invite relationship between user A and user B in an invite relationship table. The account of user A and the temporary account allocated to user B may be recorded in the invite relationship table, where the stored account of user A may be at least one of: a user identity (UID: User Identity) of user A and an SIP URI of user A. In another embodiment of the present invention, the temporary account allocated to user B has a validity period. Then, the time when the temporary account is allocated and the validity period of the temporary account may be further recorded in the invite relationship table. When the validity period is a default validity period, only the time when the temporary account is allocated is recorded in the invite relationship table.

After receiving the invite request sent by the first system client, the RCS gateway returns an invite request response (not shown in the drawing) to the first system client.

205: The RCS gateway sends, to an IMS core network, a first registration request used to request a network element of the IMS core network to register the temporary account allocated to user B, where the first registration request carries the temporary account allocated to user B.

206: The IMS core network sends a first registration response to the RCS gateway, where the first registration response carries information about whether the temporary account allocated to user B is successfully registered. In this embodiment, only the case of successful registration is considered.

207: The RCS gateway sends, to an IM server, a second registration request used to request the IM server to register the temporary account allocated to user B, where the second registration request carries the temporary account allocated to user B.

208: The IM server sends a second registration response to the RCS gateway, where the second registration response carries information about whether the temporary account allocated to user B is successfully registered. In this embodiment, only the case of successful registration is considered.

209: The RCS gateway sets the temporary account and the login password allocated to user B in an invite link, and sends an E-mail to the E-mail address of user B, where the E-mail includes the invite link; sending the E-mail to the E-mail address of user B specifically refers to sending the E-mail to an E-mail server corresponding to the E-mail address, and the E-mail server subsequently sends the E-mail to a terminal used by user B.

It is assumed that the login password corresponding to the temporary account sip:b@cc.com is 12345. Then, the invite link provided by an embodiment of the present invention is shown as follows:

http://host:port/rcsgw/invitee/session/sip:
b@cc.com?passwd=12345 where the RCS gateway may further add some introduction information about the invite link into the sent E-mail in order to enable user B to clearly know the function of the link when receiving the E-mail.

It can be known from the above that, the RCS gateway in this embodiment may allocate a temporary account to the unregistered RCS user when the registered RCS user requires the unregistered RCS user to perform interaction, and may send the temporary account to the unregistered RCS user, so that the unregistered RCS user may use the temporary account to interact with the registered RCS user. In this way, registered RCS users may have better service experience and unregistered RCS users are more willing to register with the RCS system and become registered RCS users, thereby accelerating popularization of the RCS.

Figure 3:
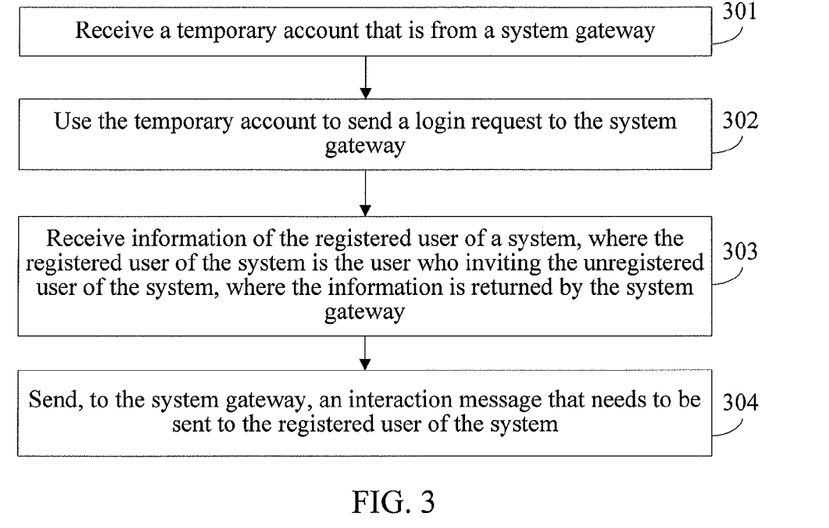
FIG. 3 is a flow chart of an interaction method according to an embodiment of the present invention.

An interaction method provided by an embodiment of the present invention is described hereinafter. FIG. 3 describes a process of an interaction method according to an embodiment of the present invention. The embodiment describes a processing process of a terminal, that is, a terminal used by an unregistered user of a system. The embodiment includes the following steps:

301: Receive a temporary account that is from a system gateway, where the temporary account is allocated to an unregistered user of the system and valid in the system.

Specifically, after receiving an E-mail, a short message or a multimedia message sent by the system gateway, the terminal may obtain the temporary account from the E-mail, short message or multimedia message. The temporary account may be borne in an invite link.

Further, when the temporary account has a corresponding login password, the E-mail, short message or multimedia message further includes the login password. Correspondingly, when the temporary account is borne in the invite link, the login password may also be borne in the invite link.

302: Use the temporary account to send a login request to the system gateway.

When obtaining the temporary account, or the temporary account and the login password, the unregistered user of the system may activate a second system client and then enter the temporary account or enter the temporary account and the login password. The second system client then sends the login request to the system gateway, where the login request includes the temporary account, or the temporary account and the login password, so that the system gateway is capable of performing authentication according to the temporary account, or the temporary account and the login password.

When the temporary account, or the temporary account and the login password are borne in the invite link, the second system client may be activated so long as the unregistered user of the system clicks the invite link. After being activated, the second system client may send the login request automatically, thereby reducing operations that the unregistered user of the system needs to perform and improving use willingness of the unregistered user of the system.

The second system client may be an independent client preset in the terminal. Compared with the first system client used by a registered user of the system, the independent client may not have some additional functions, but has the same basic system functions as those of the first system client. The second system client may also be a Web client, where the Web client has the same basic system functions as those of the first system client. When the temporary account, or the temporary account and the login password are borne in the invite link, the terminal may automatically activate the independent client or Web client when the unregistered user of the system clicks the invite link. The basic system functions may vary with different systems. For example, for an RCS system, the basic system functions may include an RCS session. For an IM system, the basic system functions may include an IM session. It is understandable that, the basic system functions that the second system client is capable of implementing may be customized by a system operator according to requirements.

After receiving the login request, the system gateway performs authentication according to the temporary account, or according to the temporary account and the login password carried in the login request. Specifically, the system gateway may match, in a temporary account table stored by the system gateway, the temporary account, or the temporary account and the login password carried in the login request. After the authentication succeeds, the system gateway may search an invite relationship table stored by the system gateway and find out information of the registered user of the system inviting the unregistered user of the system.

303: Receive information of the registered user of the system, where the registered user of the system is the user who invites the unregistered user of the system, where the information is returned by the system gateway.

The unregistered user of the system does not have a corresponding contact list in the system. Therefore, after logging in to the system, the second system client receives the information of the registered user of the system inviting the unregistered user of the system to perform interaction, where the information is returned by the system gateway, so that the unregistered user of the system may interact with the registered user of the system inviting the unregistered user of the system. In addition, the unregistered RCS user may interact with only a registered RCS user inviting the unregistered RCS user, and cannot interact with other registered RCS users at will.

It is understandable that, the information of the registered user of the system varies with different systems. For example, in an IM system, the information of the registered user of the system may be an IM account of the registered user of the system; in an RCS system, the information of the registered user of the system may be a UID of the registered user of the system, or an SIP URI of the registered user of the system.

304: Send, to the system gateway, an interaction message that needs to be sent to the registered user of the system, where the interaction message carries the temporary account, so that the system gateway forwards the interaction message to a first system client used by the registered user of the system after the system gateway has authenticated the temporary account.

After receiving the information of the registered user of the system inviting the unregistered user of the system, the terminal displays the information of the registered user of the system on an interface of the second system client, so that the unregistered user of the system may open a window for interacting with the registered user of the system through the second system client, thereby interacting with the registered user of the system.

Besides the interaction information of interaction between the unregistered user of the system and the registered user of the system, the interaction message may further carry the temporary account, or the temporary account and the login password, so that the system gateway may perform authentication according to the temporary account, or the temporary account and the login password, and forward the interaction message to the first system client used by the registered user of the system after the authentication succeeds. Specifically, the system gateway may forward the interaction message to the first system client through an interaction server corresponding to a current interaction type. It is understandable that, if the system gateway does not register the temporary account on the interaction server when allocating the temporary account to the unregistered user of the system, the system gateway at least needs to register the temporary account on the interaction server before forwarding the interaction message to the first system client through the interaction server.

In order to improve system security, it may be required that only when the registered user of the system is online, the unregistered user of the system invited by the registered user of the system can interact with the registered user of the system. Therefore, before the sending, to the system gateway, the interaction message that needs to be sent to the registered user of the system, the method further includes: sending a detection request for requesting detection of an online status of the registered user of the system to the system gateway; receiving the online status of the registered user of the system returned by the system gateway; and if the online status of the registered user of the system is online, sending, to the system gateway, the interaction message that needs to be sent to the registered user of the system.

It can be known from the above that, in this embodiment, the terminal used by the unregistered user of the system may use the temporary account allocated by the system gateway to log in to the system, and interact with the registered user of the system inviting the unregistered user of the system, so that registered users of the system are capable of interacting with unregistered users of the system. In this way, registered users of the system may have better service experience, and unregistered users of the system are more willing to register with the system and become registered users of the system.

Further, in another embodiment of the present invention, in order to further improve system security, when the second system client used by the unregistered user of the system or the first system client used by the registered user of the system logs out, a logout request is sent to the system gateway, so that the system gateway deletes the temporary account and the invite relationship between the temporary account and an account of the registered user of the system, or deletes the invite relationship between the temporary account and the account of the registered user of the system.

Figure 4:
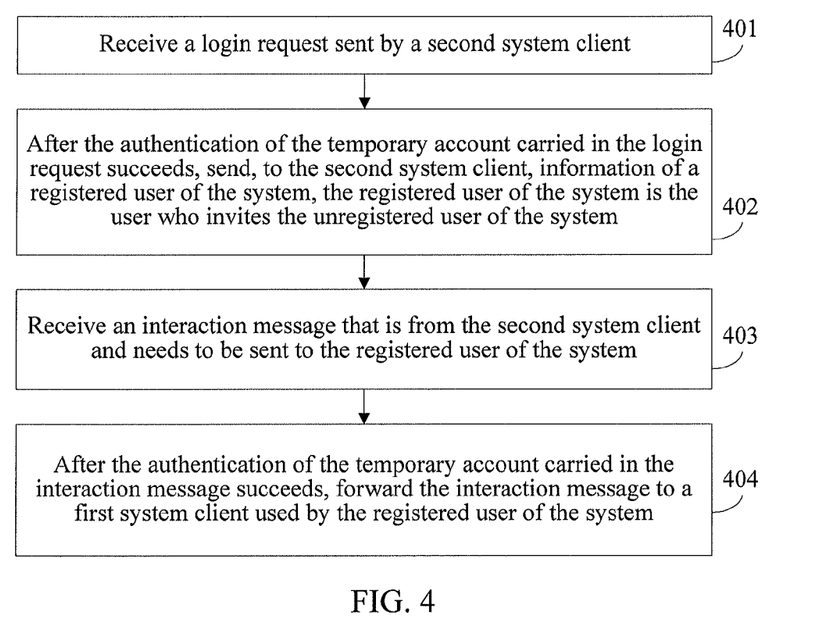
FIG. 4 is a flow chart of an interaction method according to another embodiment of the present invention.

FIG. 4 describes a process of an interaction method according to another embodiment of the present invention. The embodiment describes a processing process of a system gateway. The embodiment includes the following steps:

401: Receive a login request sent by a second system client, where the login request carries a temporary account allocated to an unregistered user of a system and valid in the system.

When the system gateway allocates a login password to the temporary account, the login request received by the system gateway may further carry the login password.

402: After the authentication of the temporary account carried in the login request succeeds, send, to the second system client, information of a registered user of the system, the registered user of the system is the user who invites the unregistered user of the system.

The system gateway may match, in a temporary account table stored by the system gateway, the temporary account, or the temporary account and the login password carried in the login request, and after the matching is successful, the system gateway may search an invite relationship table stored by the system gateway and find out information of the registered user of the system inviting the unregistered user of the system.

403: Receive an interaction message that is from the second system client and needs to be sent to the registered user of the system, where the interaction message carries the temporary account.

404: After the authentication of the temporary account carried in the interaction message succeeds, forward the interaction message to a first system client used by the registered user of the system.

The authentication on the temporary account carried in the interaction message may include: determining whether the temporary account carried in the interaction message has an invite relationship with an account of the registered user of the system according to the stored invite relationship between the temporary account and the account of the registered user of the system; and determining that the authentication succeeds if the temporary account carried in the interaction message has an invite relationship with the account of the registered user of the system.

It can be known from the above that, in this embodiment, so long as the system gateway has authenticated the temporary account, the second system client logs in and interacts with the first system client. Therefore, registered users of one system are capable of interacting with unregistered users of the system, so that registered users of the system may have better service experience and unregistered users of the system are more willing to register with the system and become registered users of the system.

A process that the system gateway forwards the interaction message to the first system client used by the registered user of the system may vary with different systems. In general cases, the system gateway may forward the interaction message to the first system client through an interaction server. For example, in an IM system, the system gateway may forward the interaction message to an IM server, and the IM server forwards the interaction message to the first system client. In an RCS system, when an interaction type is IM interaction, the system gateway may forward the interaction message to an IM server of the RCS system through an IMS core network, and then the IM server forwards the interaction message to the first system client.

When a first protocol is used for interaction between the second system client used by the unregistered user of the system and the system gateway, a second protocol is used for intra-system interaction, and the first protocol is different from the second protocol, the forwarding, by the system gateway, the interaction message to the first system client used by the registered user of the system may specifically include: converting, for the interaction message, a format of the first protocol for interaction between the second system client and the system gateway, into a format of the second protocol used for the intra-system interaction; and forwarding the interaction message the format of which is converted to the format of the second protocol to the first system client. The intra-system interaction includes interaction between intra-system network elements, and interaction between an intra-system network element and the first system client used by the registered user of the system.

In another embodiment of the present invention, in order to improve security of system interaction, before the system gateway forwards the interaction message to the first system client used by the registered user of the system, the following step may be further included:

In another embodiment of the present invention, in order to achieve the objective that the unregistered user of the system invited by the registered user of the system is capable of interacting with the registered user of the system only when the registered user of the system is online, the second system client used by the unregistered user of the system may send a detection request for detecting an online status of the registered user of the system to the system gateway. Therefore, the system gateway receives the detection request for requesting detection of the online status of the registered user of the system from the second system client. As a result, the system gateway may detect the online status of the registered user of the system, and return a detection response carrying the online status of the registered user of the system to the second system client.

An RCS system is taken as an example. It is assumed that a registered RCS user is user A, and an unregistered RCS user is user B. Then, a second system client used by user B may send a status message to an RCS gateway, so as to request the RCS gateway to detect an online status of user A. It is assumed that an SIP URI of user A is sip:a@cc.com. Then the status message sent by the second system client may be shown as follows:
    GET http://host:port/rcsgw/invitee/status/sip:a@cc.com HTTP/1.1
    Authorization: Basic QUNSO1NFQ1VSSVRZVE9LRU4= where Authorization is a character string obtained by performing BASE64 encryption on a temporary account and a login password of user B.

After receiving the status message, the RCS gateway performs authentication on user B according to Authorization, and after the authentication succeeds, verifies whether user B has a right to query the online status of user A according to an invite relationship table stored by the RCS gateway. If user B has the right to query the online status of user A, the RCS gateway converts the status message into an SIP OPTIONS message, sends the SIP OPTIONS message to the IMS core network, and returns the online status of user A to the second client used by user B after receiving the online status of user A returned by the IMS core network.

It is understandable that the second system client may send the status message to the system gateway periodically, so that the system gateway periodically detects the online status of the registered user of the system. Definitely, the second system client may also send the status message to the system gateway only once, and the system gateway automatically detects the online status of the registered user of the system periodically. It should be noted that, although the system gateway periodically detects the online status of the registered user of the system, as long as the detected online status of the registered user of the system remains unchanged as compared with the online status previously returned to the second system client, the system gateway does not need to return the online status of the registered user of the system to the second system client again.

Both the unregistered user of the system and the registered user of the system in interaction may be offline during the interaction or after completion of the interaction. If the unregistered user of the system is offline, the second system client used by the unregistered user of the system sends a logout request to the system gateway, to request logout; if the registered user of the system is offline, the first system client used by the registered user of the system also sends a logout request to the system gateway, to request logout. Therefore, in another embodiment of the present invention, the system gateway receives the logout request from the first system client used by the registered user of the system, or from the second system client used by the unregistered user of the system. At this time, the system gateway may delete the temporary account and the invite relationship between the temporary account and the account of the registered user of the system, or delete the invite relationship between the temporary account and the account of the registered user of the system. That is, after receiving the logout request, the system gateway may delete the invite relationship between the temporary account and the account of the registered user of the system from the invite relationship table stored by the system gateway, and delete the temporary account allocated to the unregistered user of the system from the temporary account table; or, if the system gateway allocates the same temporary account to the same unregistered user of the system at different times, the system gateway may only delete the invite relationship between the temporary account and the account of the registered user of the system from the invite relationship table. If another registered user of the system invites the unregistered user of the system to perform interaction, the system gateway may directly obtain the temporary account allocated to the unregistered user of the system from the temporary account table.

Figure 5:
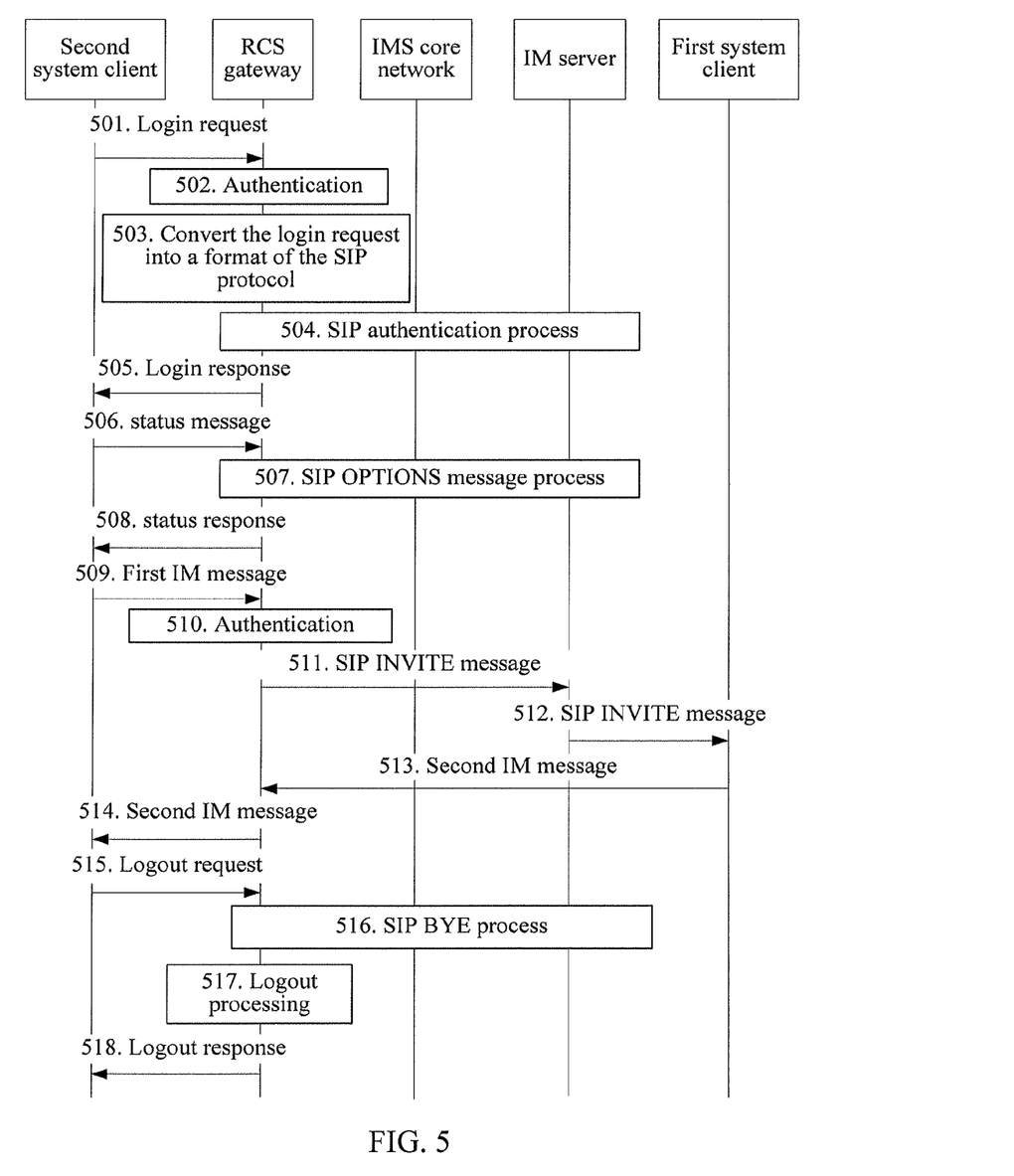
FIG. 5 is a signaling flow chart of an interaction method according to another embodiment of the present invention.

FIG. 5 describes a signaling process chart of an interaction method according to another embodiment of the present invention. The embodiment specifically describes a process that a registered RCS user and an unregistered RCS user perform IM interaction in an RCS system. The embodiment includes the following steps:

501: After user B activates a second system client, the second system client sends a login request to the RCS gateway, where the login request carries a temporary account.

User B is an unregistered RCS user, and the temporary account is allocated to user B by the RCS gateway.

502: The RCS gateway performs authentication on the temporary account.

The RCS gateway may match, in a temporary account table, the temporary account carried in the login request. If a corresponding temporary account is obtained in the temporary account table through matching, the authentication succeeds; otherwise, the authentication fails.

503: After the RCS gateway has authenticated the temporary account, the RCS gateway converts the login request into a format of the SIP protocol.

A protocol adopted by the login request received by the RCS gateway may be a Restful protocol, or may be a hypertext transport protocol (HTTP: HyperText Transport Protocol)+an extensive makeup language (XML: Extensive Makeup Language) protocol. Specifically, when the second system client is an independent client, the protocol adopted by the login request may be the Restful protocol; when the second system client is a Web client, the protocol adopted by the login request may be the HTTP+the XML protocol, or the Restful protocol.

504: The RCS gateway initiates an SIP authentication process by using the login request of the SIP protocol, so that an IMS core network and an IM server authenticate the login request of the SIP protocol.

After the RCS gateway allocates the temporary account to the unregistered RCS user, the temporary account is already registered at the IMS core network and the IM server. Therefore, the login request of the SIP protocol is capable of authenticating at the IMS core network and the IM server.

505: After receiving a response that is returned by the IMS core network and the IM server, indicating that the authentication succeeds, the RCS gateway obtains information of a registered user of a system that has an invite relationship with the temporary account from the invite relationship table, and returns a login response carrying the obtained information of the registered user of the system to the second system client.

In this embodiment, it is assumed that the obtained information of the registered user of the system includes information of user A.

506: After receiving the login response, the second system client sends a status message to the RCS gateway for requesting the RCS gateway to detect an online status of user A.

507: After the RCS gateway has authenticated user B, the RCS gateway converts the status message into an SIP OPTIONS message, initiates an SIP OPTIONS message process by using the SIP OPTIONS message, and obtains the online status of user A from the IM server through the IMS core network.

508: After receiving the online status of user A returned by the IMS core network, the RCS gateway returns a status response carrying the online status of user A to the second system client.

509: When the online status of user A is online, user B may choose to send a first IM message to user A, and therefore, the second system client sends the first IM message to the RCS gateway.

It is assumed that an SIP URI of user A is sip:a@cc.com, and the content of the first IM message sent by user B to user A is abcdefg. Then, the first IM message sent to the RCS gateway provided in an embodiment of the present invention is shown as follows:

POST http://host:port/rcsgw/invitee/message HTTP/1.1
Authorization: Basic QUNSOlNFQ1VSSVRZVE9LRU4=
{"to":"sip:a@cc.com","message":"abcdefg"} where the content after Authorization is a character string obtained by performing BASE64 encryption on the temporary account and the login password of user B.

The first IM message may be based on the Restful protocol or the HTTP+the XML protocol.

510: After receiving the message, the RCS gateway performs authentication on user B.

The specific authentication includes authentication on the temporary account of user B and authentication on whether user B has an invite relationship with user A.

511: After the authentication succeeds, the RCS gateway converts the first IM message into an SIP INVITE message, and sends the SIP INVITE message to the IM server via the IMS core network through an MSRP channel.

Before an MSRP channel is established between the first system client and the second system client, the SIP INVITE message may be directly sent to the IMS core network to initiate an SIP INVITE process, thereby establishing the MSRP channel.

512: The IM server forwards the SIP INVITE message to the first system client used by user A.

After receiving the SIP INVITE message, the first system client establishes the MSRP channel between the first system client and the RCS gateway, and subsequent interaction between the RCS gateway and the first system client may be directly performed through the MSRP channel.

513: User A replies to user B with a message, and the first system client sends a second IM message to the RCS gateway through the MSRP channel.

514: After converting the second IM message into a message of the Restful protocol or a message of the HTTP+the XML protocol, the RCS gateway sends the converted second IM message to the second system client.

515: User B chooses to finish interaction, and the second system client sends a logout request to the RCS gateway.

516: The RCS gateway converts the logout request into an SIP protocol format, sends the logout request the format of which is converted into the SIP protocol format to the IM server through the IMS core network, and initiates an SIP BYE process by using the logout request of the SIP protocol format, so as to dismantle the MSRP channel.

517: The RCS gateway performs logout processing.

Specifically, the logout processing includes deleting the invite relationship between the temporary account of user B and an account of user A from the invite relationship table, and further may include deleting the temporary account of user B from the temporary account table.

518: After finishing the logout processing, the RCS gateway sends a logout response to the second system client.

It can be known from the above that, in this embodiment, so long as the RCS gateway has authenticated the temporary account, the second system client may log in and interact with the first system client, and as a result, the unregistered RCS user may use the temporary account to interact with the registered RCS user. Therefore, the registered RCS users may have better service experience, and unregistered RCS users are more willing to register with the RCS system and become registered RCS users, accelerating popularization of the RCS system.

It should be noted that, as for the foregoing method embodiments, for simple description, the methods are described as a series of action combination, but persons of ordinary skill in the art should know that, the present invention is not limited by the described action sequence, because according to the present invention, some steps may be performed in other sequences or performed simultaneously. Secondly, persons of ordinary skill in the art should also know that, the embodiments described in the specification are exemplary embodiments, and involved actions and modules are not indispensable for the present invention.

Figure 6:
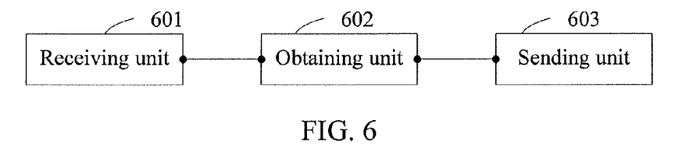
FIG. 6 is a structural diagram of a system gateway according to an embodiment of the present invention.

A device provided by an embodiment of the present invention is described hereinafter. First, a system gateway provided by an embodiment of the present invention is described. FIG. 6 describes a structure of the system gateway according to the embodiment of the present invention, including:

a receiving unit 601, configured to receive an invite request that is sent by a registered user of a system through a first system client, where the invite request includes an identifier of an unregistered user of the system;

an obtaining unit 602, configured to, after the receiving unit 601 receives the invite request, obtain a temporary account allocated to the unregistered user of the system and valid in the system; and a sending unit 603, configured to send, according to the identifier of the unregistered user of the system, the temporary account obtained by the obtaining unit 602 to a terminal used by the unregistered user of the system.

It can be known from the above that, the system gateway in this embodiment may allocate a temporary account to the unregistered user of the system when the registered user of the system requires the unregistered user of the system to perform interaction, and may allocate the temporary account to the unregistered user of the system, so that the unregistered user of the system may use the temporary account to interact with the registered user of the system. In this way, registered users of the system may interact with unregistered users of the system, so that the registered users of the system may have better service experience and the unregistered users of the system are more willing to register with the system and become registered users of the system.

Figure 7:
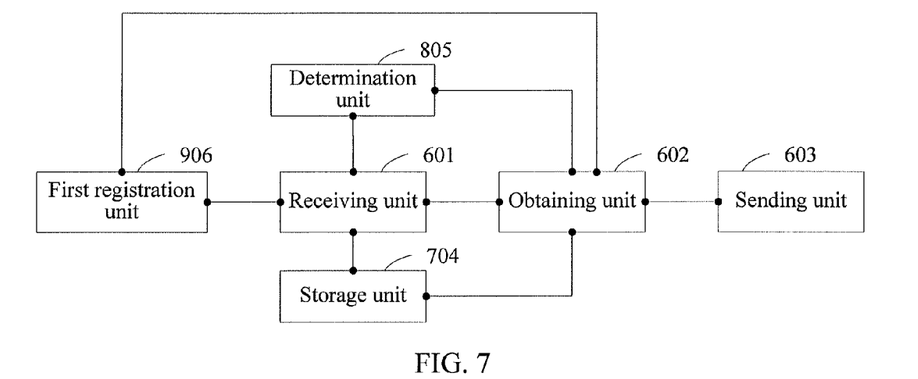
FIG. 7 is a structural diagram of a system gateway according to another embodiment of the present invention.

FIG. 7 describes a structure of a system gateway according to another embodiment of the present invention, including:

a receiving unit 601, configured to receive an invite request that is sent by a registered user of a system through a first system client, where the invite request includes an identifier of an unregistered user of the system, and the invite request further includes an account of the registered user of the system;

an obtaining unit 602, configured to, after the receiving unit 601 receives the invite request, obtain a temporary account allocated to the unregistered user of the system and valid in the system;

a sending unit 603, configured to send, according to the identifier of the unregistered user of the system, the temporary account obtained by the obtaining unit 602 to a terminal used by the unregistered user of the system; and a storage unit 704, configured to store an invite relationship between the temporary account obtained by the obtaining unit 602 and the account of the registered user of the system received by the receiving unit 601.

As shown in FIG. 7, the system gateway according to another embodiment of the present invention may further include a determination unit 805, configured to determine whether the registered user of the system has a right to send an invite request according to the account of the registered user of the system received by the receiving unit 601. At this time, the obtaining unit 602 is configured to obtain the temporary account allocated to the unregistered user of the system only when the determination unit 805 determines that the registered user of the system has the right to send an invite request.

The invite request received by the receiving unit 601 that is shown in FIG. 7 and is included in the system gateway according to another embodiment of the present invention, may further include an interaction type of interaction that the registered user of the system invites the unregistered user of the system to perform. Then, the system gateway according to the embodiment may further include a first registration unit 906, configured to register the temporary account obtained by the obtaining unit 602 on an interaction server corresponding to the interaction type received by the receiving unit 601.

The system gateway according to another embodiment of the present invention may further be applied to an RCS system, and is specifically used as an RCS gateway in the RCS system. When applied to the RCS system, the system gateway may further include a second registration unit, configured to register the temporary account allocated by the allocation unit 602 at an IMS core network, where the second registration unit is not shown in the drawing.

Figure 8:
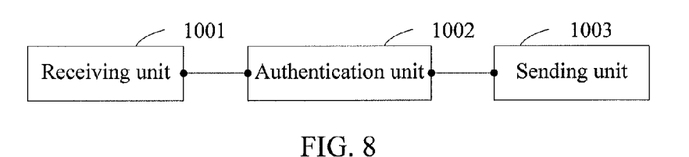
FIG. 8 is a structural diagram of a system gateway according to another embodiment of the present invention.

FIG. 8 describes a structure of a system gateway according to another embodiment of the present invention, including:

a receiving unit 1001, configured to receive a login request sent by a second system client, where the login request carries a temporary account allocated to an unregistered user of a system and valid in the system;

an authentication unit 1002, configured to perform authentication on the temporary account carried in the login request received by the receiving unit 1001; and a sending unit 1003, configured to send, to the second system client, information of a registered user of the system inviting the unregistered user of the system after the authentication unit 1002 has authenticated the temporary account carried in the login request.

The receiving unit 1001 is further configured to receive an interaction message that is from the second system client and needs to be sent to the registered user of the system, where the interaction message carries the temporary account.

The authentication unit 1002 is further configured to perform authentication on the temporary account carried in the interaction message received by the receiving unit 1001.

In an embodiment of the present invention, the authentication unit 1002 may be specifically configured to determine whether the temporary account carried in the interaction message has an invite relationship with an account of the registered user of the system according to a stored invite relationship between the temporary account and the account of the registered user of the system, and if the temporary account carried in the interaction message has an invite relationship with the account of the registered user of the system, determine that the authentication succeeds.

The sending unit 1003 is further configured to forward the interaction message to a first system client used by the registered user of the system after the authentication unit 1002 has authenticated the temporary account carried in the interaction message.

In an embodiment of the present invention, the sending unit 1003 may be specifically configured to convert, for the interaction message, a format of a first protocol for interaction between the second system client and the system gateway into a format of a second protocol used for intra-system interaction, and then forward the interaction message the format of which is converted into the format of the second protocol to the first system client.

It can be known from the above that, in this embodiment, so long as the system gateway has authenticated the temporary account, the second system client may log in and interact with the first system client. Therefore, registered users of one system are capable of interacting with unregistered users of the system, so that registered users of the system may have better service experience and unregistered users of the system are more willing to register with the system and become registered users of the system.

Figure 9:
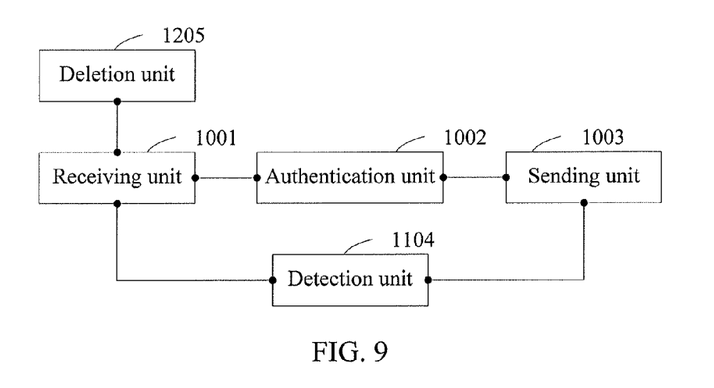
FIG. 9 is a structural diagram of a system gateway according to another embodiment of the present invention.

FIG. 9 describes a structure of a system gateway according to another embodiment of the present invention, including:

a receiving unit 1001, configured to receive a login request sent by a second system client, where the login request carries a temporary account allocated to an unregistered user of a system and valid in the system;

an authentication unit 1002, configured to perform authentication on the temporary account carried in the login request received by the receiving unit 1001;

a sending unit 1003, configured to send, to the second system client, information of a registered user of the system inviting the unregistered user of the system after the authentication unit 1002 has authenticated the temporary account carried in the login request, where the receiving unit 1001 is further configured to receive a detection request from the second system client for requesting detection of an online status of the registered user of the system; and a detection unit 1104, configured to detect the online status of the registered user of the system after the receiving unit 1001 receives the detection request.

The sending unit 1003 is further configured to return the online status of the registered user of the system detected by the detection unit 1104 to the second system client.

The receiving unit 1001 is further configured to receive an interaction message that is from the second system client and needs to be sent to the registered user of the system, where the interaction message carries the temporary account.

The authentication unit 1002 is further configured to perform authentication on the temporary account carried in the interaction message received by the receiving unit 1001.

The sending unit 1003 is further configured to forward the interaction message to a first system client used by the registered user of the system after the authentication unit 1002 has authenticated the temporary account carried in the interaction message.

As shown in FIG. 9, in another embodiment of the present invention, the receiving unit 1001 is further configured to receive a logout request from the first system client or the second system client. At this time, the system gateway according to the embodiment may further include a deletion unit 1205 shown in FIG. 9, which is configured to delete the temporary account and an invite relationship between the temporary account and an account of the registered user of the system, or delete the invite relationship between the temporary account and the account of the registered user of the system after the receiving unit 1001 receives the logout request.

Figure 10:
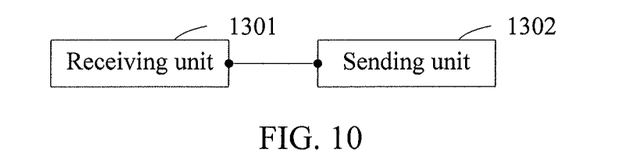
FIG. 10 is a structural diagram of a terminal according to an embodiment of the present invention.

A terminal provided by an embodiment of the present invention is further described. FIG. 10 describes a structure of a terminal according to an embodiment of the present invention, including:

a receiving unit 1301, configured to receive a temporary account that is from a system gateway, where the temporary account is allocated to an unregistered user of a system and valid in the system; and a sending unit 1302, configured to send a login request to the system gateway, where the login request includes the temporary account received by the receiving unit 1301.

The receiving unit 1301 is further configured to receive information of a registered user of the system inviting the unregistered user of the system, where the information is returned by the system gateway.

The sending unit 1302 is further configured to send, to the system gateway, an interaction message that needs to be sent to the registered user of the system, where the interaction message carries the temporary account, so that the system gateway forwards the interaction message to a first system client used by the registered user of the system after the system gateway has authenticated the temporary account.

It can be known from the above that, in this embodiment, the terminal used by the unregistered user of the system may use the temporary account allocated by the system gateway to log in to the system, and interact with the registered user of the system inviting the unregistered user of the system, so that registered users of the system are capable of interacting with unregistered users of the system. In this way, registered users of the system may have better service experience, and unregistered users of the system are more willing to register with the system and become registered users of the system.

In another embodiment of the present invention, the sending unit 1302 included in the terminal provided by the embodiment of the present invention may be further configured to send a detection request for requesting detection of an online status of the registered user of the system to the system gateway. The receiving unit 1301 may be further configured to receive the online status of the registered user of the system returned by the system gateway. The sending unit 1302 is configured to send, to the system gateway, the interaction message that needs to be sent to the registered user of the system only when the online status of the registered user of the system is online.

In another embodiment of the present invention, the sending unit 1302 included in the terminal provided by the embodiment of the present invention may be further configured to send a logout request to the system gateway, so that the system gateway deletes the temporary account and an invite relationship between the temporary account and an account of the registered user of the system, or deletes the invite relationship between the temporary account and the account of the registered user of the system.

Figure 11:
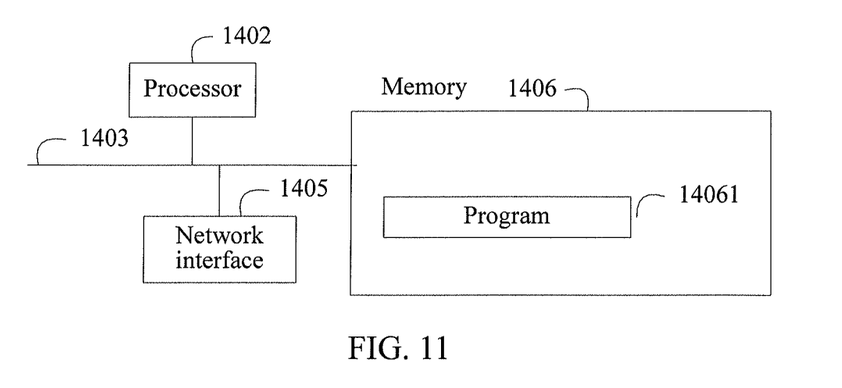
FIG. 11 is a structural diagram of a system gateway according to another embodiment of the present invention.

FIG. 11 describes a structure of a system gateway according to another embodiment of the present invention, including at least one processor 1402 (such as a CPU), at least one network interface 1405 or other communication interfaces, a memory 1406, and at least one communication bus 1403 for implementing connections and communications among these devices. The processor 1402 is configured to execute executable modules such as a computer program stored in the memory 1406. The memory 1406 may include a high speed random access memory (RAM: Random Access Memory), or may further include a non-volatile memory (non-volatile memory), for example, at least one magnetic disk memory. A communication connection between the system gateway and at least one other network element is implemented through the at least one network interface 1405 (which may be wired or wireless), and Internet, a wide area network, a local area network, or a metropolitan area network may be used.

In some implementations, a program 14061 is stored in the memory 1406, and the program 14061 may be executed by the processor 1402. The program implements operations including: receiving an invite request that is sent by a registered user of a system through a first system client, where the invite request includes an identifier of an unregistered user of the system; obtaining a temporary account allocated to the unregistered user of the system and valid in the system; and sending, according to the identifier of the unregistered user of the system, the temporary account to a terminal used by the unregistered user of the system.

Figure 12:
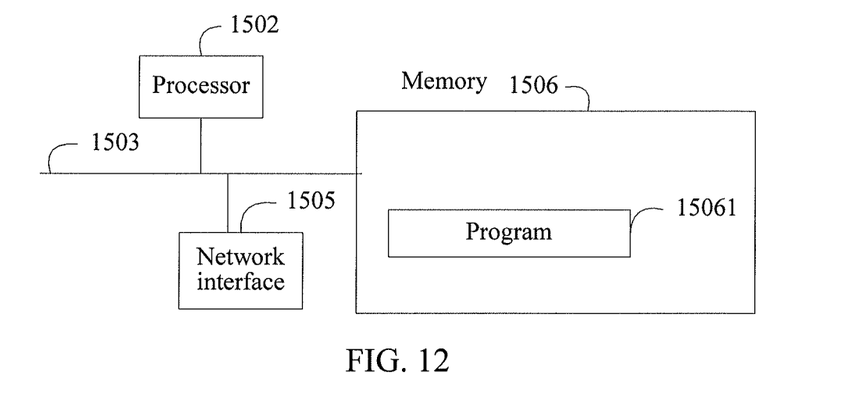
FIG. 12 is a structural diagram of a system gateway according to another embodiment of the present invention.

FIG. 12 describes a structure of a system gateway according to another embodiment of the present invention, including at least one processor 1502 (such as a CPU), at least one network interface 1505 or other communication interfaces, a memory 1506, and at least one communication bus 1503 for implementing connections and communications among these devices. The processor 1502 is configured to execute executable modules such as a computer program stored in the memory 1506. The memory 1506 may include a high speed random access memory (RAM: Random Access Memory), or may further include a non-volatile memory (non-volatile memory), for example, at least one magnetic disk memory. A communication connection between the system gateway and at least one other network element is implemented through the at least one network interface 1505 (which may be wired or wireless), and Internet, a wide area network, a local area network, or a metropolitan area network may be used.

In some implementations, a program 15061 is stored in the memory 1506, and the program 15061 may be executed by the processor 1502. The program implements operations including: receiving a login request sent by a second system client, where the login request carries a temporary account allocated to an unregistered user of a system and valid in the system; after the authentication of the temporary account carried in the login request succeeds, sending, to the second system client, information of a registered user of the system inviting the unregistered user of the system; receiving an interaction message that is from the second system client and needs to be sent to the registered user of the system, where the interaction message carries the temporary account; and after the authentication of the temporary account carried in the interaction message succeeds, forwarding the interaction message to a first system client used by the registered user of the system.

Figure 13:
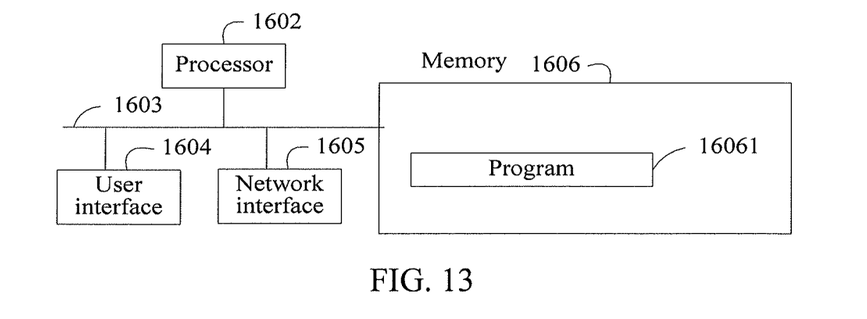
FIG. 13 is a structural diagram of a terminal according to another embodiment of the present invention.

FIG. 13 describes a structure of a terminal according to another embodiment of the present invention, including at least one processor 1602 (such as a CPU), at least one network interface 1605 or other communication interfaces, a memory 1606, and at least one communication bus 1603 for implementing connections and communications among these devices. The processor 1602 is configured to execute executable modules such as a computer program stored in the memory 1606. The terminal includes a user interface 1604 optionally, and includes, but is not limited to, a display, a keyboard and a clicking device (for example, a mouse, and a trackball (trackball)), a touch pad or a touch display screen. The memory 1606 may include a high speed random access memory (RAM: Random Access Memory), or may further include a non-volatile memory (non-volatile memory), for example, at least one magnetic disk memory. A communication connection between the system gateway and at least one other network element is implemented through the at least one network interface 1505 (which may be wired or wireless), and Internet, a wide area network, a local area network, or a metropolitan area network may be used.

In some implementations, a program 16061 is stored in the memory 1606, and the program 16061 may be executed by the processor 1602. The program implements operations including: receiving a temporary account that is from a system gateway, and using the temporary account to send a login request to the system gateway, where the temporary account is allocated to an unregistered user of the system and valid in the system; receiving information of a registered user of the system inviting the unregistered user of the system, where the information is returned by the system gateway; and sending, to the system gateway, an interaction message that needs to be sent to the registered user of the system, where the interaction message carries the temporary account, so that the system gateway forwards the interaction message to the first system client used by the registered user of the system after the system gateway has authenticated the temporary account.

Because the content such as information interaction and execution process among the modules in the above device and system are based on the same thinking as the method embodiments of the present invention, for specific content, reference may be made to the descriptions of the method embodiments of the present invention, which are not described herein again.

Persons of ordinary skill in the art should understand that all or a part of the processes of the method according to the embodiments of the present invention may be implemented by a computer program instructing relevant hardware. The program may be stored in a computer readable storage medium. When the program is run, the processes of the method according to the embodiments of the present invention are performed. The storage medium may be a magnetic disk, an optical disk, a read-only memory (ROM: Read-Only Memory) or a random access memory (RAM: Random Access Memory).

Specific cases are used for illustrating principles and implementation manners of the present invention. The descriptions of the embodiments are merely for understanding the method and ideas of the present invention. Meanwhile, persons of ordinary skill in the art may make modifications to specific implementation manners and application ranges according to the ideas of the present invention. In conclusion, the content of the specification shall not be construed as a limitation to the present invention.

What is claimed is:

1. A user registration method, comprising:
   receiving an invite request that is sent by a registered user of a system through a first system client, wherein the invite request comprises an identifier of an unregistered user of the system, an account of the registered user of the system and an interaction type which indicates an interaction that the registered user of the system invites the unregistered user of the system to perform;
   determining whether the registered user of the system has a right to send an invite request according to the account of the registered user of the system;
   obtaining a temporary account allocated to the unregistered user of the system and valid in the system only when determining that the registered user of the system has the right to send the invite request;
   storing an invite relationship between the temporary account and the account of the registered user of the system;
   registering the temporary account on an interaction server corresponding to the interaction type; and
   sending, according to the identifier of the unregistered user of the system, the temporary account to a terminal used by the unregistered user of the system.

2. The user registration method according to claim 1, wherein the system is a rich communication suite system, and after the obtaining the temporary account allocated to the unregistered user of the system and valid in the system, the method further comprises:
   registering the temporary account at an Internet protocol multimedia subsystem core network.

3. The user registration method according to claim 1, comprising: when obtaining the temporary account allocated to the unregistered user of the system and valid in the system, further obtaining a login password of the temporary account for logging in to the system; and
   when sending the temporary account to the terminal used by the unregistered user of the system, further sending the login password to the terminal used by the unregistered user of the system.

4. The user registration method according to claim 1, wherein the sending, according to the identifier of the unregistered user of the system, the temporary account to the terminal used by the unregistered user of the system comprises:
   setting the temporary account in an invite link, and sending, according to the identifier of the unregistered user of the system, the invite link to the terminal used by the unregistered user of the system.

5. The user registration method according to claim 1, wherein the identifier of the unregistered user of the system is an E-mail address of the unregistered user of the system; and
   the sending the temporary account to the terminal used by the unregistered user of the system comprises: sending the temporary account to the E-mail address by means of an E-mail;
   or
   the identifier of the unregistered user of the system is a terminal number of the unregistered user of the system; and
   the sending the temporary account to the terminal used by the unregistered user of the system comprises: sending the temporary account to a terminal corresponding to the terminal number by means of a short message or a multimedia short message.

6. The user registration method according to claim 5, wherein the temporary account is the E-mail address or generated according to the E-mail address, or is the terminal number or generated according to the terminal number.

7. An interaction method, comprising:
   receiving a temporary account that is from a system gateway, and using the temporary account to send a login request to the system gateway, wherein the temporary account is allocated to an unregistered user of a system and valid in the system and the temporary account has been registered on an interaction server corresponding to an interaction type and the interaction type indicates an interaction that a registered user of the system invites the unregistered user of the system to perform;
   receiving information of the registered user of the system, wherein the information is returned by the system gateway;
   sending a detection request for requesting detection of an online status of the registered user of the system to the system gateway;
   receiving the online status of the registered user of the system returned by the system gateway; and sending, to the system gateway, an interaction message that needs to be sent to the registered user of the system only if the online status of the registered user of the system is online, wherein the interaction message carries the temporary account, so that the system gateway forwards the interaction message to a first system client used by the registered user of the system after the system gateway has authenticated the temporary account.

8. The interaction method according to claim 7, further comprising:
sending a logout request to the system gateway, so that the system gateway deletes the temporary account and an invite relationship between the temporary account and an account of the registered user of the system, or deletes the invite relationship between the temporary account and the account of the registered user of the system.

9. An interaction method, comprising:
receiving a login request sent by a second system client, wherein the login request carries a temporary account allocated to an unregistered user of a system and valid in the system and the temporary account has been registered on an interaction server corresponding to an interaction type and the interaction type indicates an interaction that a registered user of the system invites the unregistered user of the system to perform;
according to a stored invite relationship between a temporary account and an account of a registered user of the system, determining whether the temporary account carried in the interaction message has an invite relationship with the account of the registered user of the system;
if the temporary account carried in the interaction message has an invite relationship with the account of the registered user of the system, determining that the authentication succeeds;
after authentication of the temporary account carried in the login request succeeds, sending, to the second system client, information of the registered user of the system;
receiving an interaction message that is from the second system client and needs to be sent to the registered user of the system, wherein the interaction message carries the temporary account; and
after the authentication of the temporary account carried in the interaction message succeeds, forwarding the interaction message to a first system client used by the registered user of the system.

10. The interaction method according to claim 9, wherein the forwarding the interaction message to the registered user of the system comprises:
converting, for the interaction message, a format of a first protocol for interaction between the second system client and the system gateway into a format of a second protocol used for interaction in the system; and
forwarding the interaction message the format of which is converted into of the format of the second protocol to the first system client.

11. The interaction method according to claim 9, further comprising:
receiving a detection request from the second system client for requesting detection of an online status of the registered user of the system;
detecting the online status of the registered user of the system; and
returning the online status of the registered user of the system to the second system client.

12. The interaction method according to claim 9, further comprising:
receiving a logout request from the first system client or the second system client; and
deleting the temporary account and the invite relationship between the temporary account and the account of the registered user of the system, or deleting the invite relationship between the temporary account and the account of the registered user of the system.

13. A system gateway, comprising:
a processor and memory, the memory having a computer program wherein the processor executes the computer program to comprise:
a receiving unit, that receives an invite request that is sent by a registered user of a system through a first system client, wherein the invite request comprises an identifier of an unregistered user of the system, an account of the registered user of the system and an interaction type which indicates an interaction that the registered user of the system invites the unregistered user of the system to perform;
a determination unit, that determines whether the registered user of the system has a right to send an invite request according to the account of the registered user of the system;
an obtaining unit, that obtains a temporary account allocated to the unregistered user of the system and valid in the system only when the determination unit determines that the registered user of the system has the right to send the invite request;
a storage unit, that stores an invite relationship between the temporary account and the account of the registered user of the system;
a first registration unit, that registers the temporary account on an interaction server corresponding to the interaction type; and
a sending unit, that sends, according to the identifier of the unregistered user of the system, the temporary account to a terminal used by the unregistered user of the system.

14. The system gateway according to claim 13, wherein the system is a rich communication suite system, and the system gateway further comprises:
a second registration unit, that registers the temporary account at an Internet protocol multimedia subsystem core network.

15. A terminal, comprising:
a processor and memory, the memory having a computer program wherein the processor executes the computer program to comprise:
a receiving unit, that receives a temporary account that is from a system gateway, wherein the temporary account is allocated to an unregistered user of a system and valid in the system and the temporary account has been registered on an interaction server corresponding to an interaction type and the interaction type indicates an interaction that a registered user of the system invites the unregistered user of the system to perform; and
a sending unit, that sends a login request to the system gateway, wherein the login request comprises the temporary account received by the receiving unit,
wherein the receiving unit further receives information of the registered user of the system, wherein the information is returned by the system gateway; and
the sending unit further sends, to the system gateway, an interaction message that needs to be sent to the registered user of the system, wherein the interaction message carries the temporary account, so that the system gateway forwards the interaction message to a first system client used by the registered user of the system after the system gateway has authenticated the temporary account;

wherein the sending unit further sends a detection request for requesting detection of an online status of the registered user of the system to the system gateway;

the receiving unit further receives the online status of the registered user of the system returned by the system gateway; and the sending unit further sends, to the system gateway, the interaction message that needs to be sent to the registered user of the system only when the online status of the registered user of the system is online.

16. The terminal according to claim 15, wherein the sending unit further sends a logout request to the system gateway, so that the system gateway deletes the temporary account and an invite relationship between the temporary account and an account of the registered user of the system, or deletes the invite relationship between the temporary account and the account of the registered user of the system.

17. A system gateway, comprising:
a processor and memory, the memory having a computer program wherein the processor executes the computer program to comprise:
a receiving unit, that receives a login request sent by a second system client, wherein the login request carries a temporary account allocated to an unregistered user of a system and valid in the system and the temporary account has been registered on an interaction server corresponding to an interaction type and the interaction type indicates an interaction that a registered user of the system invites the unregistered user of the system to perform;
an authentication unit, that performs authentication on the temporary account carried in the login request; and
a sending unit, that sends, to the second system client, information of the registered user of the system after the authentication unit has authenticated the temporary account carried in the login request,
wherein the receiving unit further receives an interaction message that is from the second system client and needs to be sent to the registered user of the system, and the interaction message carries the temporary account;

the authentication unit performs authentication on the temporary account carried in the interaction message, wherein the authentication unit determines whether the temporary account carried in the interaction message has an invite relationship with an account of the registered user of the system according to a stored invite relationship between a temporary account and an account of a registered user of the system; and if the temporary account carried in the interaction message has an invite relationship with the account of the registered user of the system, determine that the authentication succeeds; and the sending unit forwards the interaction message to a first system client used by the registered user of the system after the authentication unit has authenticated the temporary account carried in the interaction message.

18. The system gateway according to claim 17, wherein the sending unit converts, for the interaction message, a format of a first protocol for interaction between the second system client and the system gateway into a format of a second protocol used for interaction in the system; and forward the interaction message the format of which is converted into the format of the second protocol to the first system client.

19. The system gateway according to claim 17, further comprising a detection unit,
wherein the receiving unit receives a detection request from the second system client for requesting detection of an online status of the registered user of the system;
the detection unit detects the online status of the registered user of the system after the receiving unit receives the detection request; and
the sending returns the online status of the registered user of the system to the second system client.

20. The system gateway according to claim 17, further comprising a deletion unit,
wherein the receiving unit receives a logout request from the first system client or the second system client; and
the deletion unit, after the receiving unit receives the logout request, deletes the temporary account and the invite relationship between the temporary account and the account of the registered user of the system, or deletes the invite relationship between the temporary account and the account of the registered user of the system.

* * * * *